United States Patent
Van Paesschen et al.

[15] 3,650,740

[45] Mar. 21, 1972

[54] TRANSFER OF SHEET-LIKE MATERIAL

[72] Inventors: August Jean Van Paesschen, Antwerpen; Lucien Jan Baptist Van Gossum, Kontich, both of Belgium

[73] Assignee: Gevaert-AGFA N.V., Mortsel, Belgium

[22] Filed: May 31, 1968

[21] Appl. No.: 733,313

[30] Foreign Application Priority Data

June 1, 1967   Great Britain .................... 25,418/67

[52] U.S. Cl. .................................................. 96/28, 156/230
[51] Int. Cl. .................................... G03c 11/12, B44c 31/00
[58] Field of Search .................... 96/28, 115, 35.1; 156/241, 156/242, 230; 101/34

[56] References Cited

UNITED STATES PATENTS

| | | | |
|---|---|---|---|
| 3,346,383 | 10/1967 | Baxendale et al. | 96/28 |
| 3,353,955 | 11/1967 | Colgrove | 96/28 |
| 3,202,508 | 8/1965 | Heiart | 96/28 |
| 3,234,021 | 2/1966 | Schwerin | 96/28 |
| 3,206,308 | 9/1965 | Bean | 96/28 |
| 3,194,661 | 7/1965 | Cohen | 96/28 |
| 3,138,460 | 6/1964 | Levinos | 96/28 |
| 1,832,531 | 11/1931 | Close | 156/241 |
| 2,688,579 | 9/1954 | Meyer | 156/230 |

*Primary Examiner*—Norman G. Torchin
*Assistant Examiner*—Edward C. Kimlin
*Attorney*—William J. Daniel

[57] ABSTRACT

Visible image-shaped regions of colloid material in a thin layer are transferred from a temporary support to a permanent support by means of a chemically hardenable adhesive applied as a liquid coating between the colloid material to be transferred and the permanent support and allowed to harden so that the temporary support can be peeled away. The visible image-shaped regions of the colloid material can form part of an overall layer or the non-image portions of such layer can be removed in advance. A preferred colloid layer is constituted of solid hydrophobic thermoplastic polymer particles dispersed in a hydrophilic binder in a weight ratio greater than 1:1 and a preferred hardenable adhesive is an epoxy resin in liquid state having a viscosity of 8,000 to 20,000 cp. which is applied to at least the pattern on the temporary support carrying the colloid layer thereon and permeates the colloid layer so that upon hardening of such resin, improved resistance to wear, humidity and heat is imparted to the colloid.

4 Claims, No Drawings

TRANSFER OF SHEET-LIKE MATERIAL

This invention relates to a process for the transfer of sheet-like material from a temporary base to a permanent base, and which may particularly be applied to photographic processes, although it may be applied for general use.

In many cases sheetlike elements (for instance monolayer or multilayer coatings or selected parts thereof) have to be transferred from a base on which they were present to another base, which then acts as a permanent base. In photographic processing, such transfer may be effected during exposure and/or processing.

Thus it is known to transfer photographic layers by stripping onto glass plates or onto the surface of etchable printing rollers. For that purpose photographic stripping films are used comprising a photographic silver halide emulsion layer which has been applied to a so-called stripping layer, which in its turn is mounted onto a temporary support in such a way that it can be stripped off. Such a film is described for instance in Dutch Pat. No. 6609432, wherein the described stripping layer is a phenoxy resin layer.

It is clear that the stripping characteristics of such a film depend on the special stripping layer. The adhesion between this layer and the support should be sufficient to permit emulsion-coating, slitting, and other film handling operations including development, but the adhesion should nevertheless be low enough to permit continuous and rapid stripping of the stripping layer from the support. The processed emulsion layer adhering to its stripping layer can be applied in wet state to a smooth copper rotogravure cylinder. After having stripped off the temporary support, the stripping layer is eliminated by means of a swelling agent or solvent, which permits the easy removal of this layer.

The ease with which the transferable layer, e.g., transferred emulsion (colloid layer) containing the silver image can be removed from its new substrate, e.g., from a rotogravure cylinder, makes this stripping film normally unsuited for applications wherein the information has to be fixed permanently to a base as for instance in the manufacture of panels, e.g., instrument panels, advertising transparencies, name-boards, dash-boards and door-plates.

It has now been found that a "transferable layer" (or selected parts thereof) may be expeditiously transferred from a temporary support to a permanent support by the use of a layer of a hardenable composition (which term includes one or more substances) interposed between the layer to be transferred and the permanent support. The said hardenable composition may be coated initially on the exposed surface of the transferable layer while the latter is still on the temporary support (by exposed surface is meant the surface remote from the surface in contact with the temporary support), and/or it may be coated on the permanent support. In either instance after the transferable layer, with its associated temporary support, has been applied through the hardenable composition to the permanent support, the assemblage is maintained under conditions whereby the interposed layer of hardenable composition becomes hardened, and the temporary support is removed from the transferable layer which has been fixed to the permanent support by the hardened composition.

The invention therefore includes a method of transferring a transferable layer or selected parts thereof from a temporary support to a permanent support by stripping off the temporary support whereto said layer or selected parts thereof adhere while said layer adheres to the permanent support through an adhesive layer said method containing the steps of a. applying to the transferable material of said transferable layer and/or to the permanent support a hardenable composition or substance as described hereinafter;

b. contacting the transferable material through the hardenable composition or substance with the permanent support, and c. after sufficiently hardening the said composition or substance peeling apart the temporary support from the transferable material, so that the said material is left in fixed state on the permanent support.

The "hardenable composition" used in the invention includes:

a. a waxlike or polymeric organic material having a melting point above room temperature (preferably at least 50° C. and not more than 200° C.) and is applied in molten state during the contacting step. Suitable examples of such material are described in the published Dutch Pat. application No. 6704678. Microcrystalline waxes and paraffin waxes are preferred, or is b. a composition or substance which is applied in liquid, dissolved, or dispersed state and hardens by a chemical reaction between molecules of said composition or substance after the removal of the occasionally present solvent or liquid dispersing agent.

The latter hardening can be the result of a radical polymerization e.g., of $\alpha,\beta$-ethylenically unsaturated groups (i.a. being present in methyl methacrylate, styrene-alkyd resins and analogues) or can be due to a polyaddition reaction. In the latter case the polyaddition of compounds containing epoxy groups and/or of compounds containing isocyanate groups with compounds containing an active hydrogen atom is preferred.

The polymerization reaction or polyaddition reactions is preferably a cold-hardening reaction wherein suitable initiators and catalysts are applied (ref. e.g., Canadian Pat. No. 698,689) but can also be an oven-cured reaction.

The transferable material is preferably a layer or selected parts of a layer. By the term "transferable layer" a monolayer as well as a multilayer coating is to be understood, e.g., a colloid monolayer, or colloid multilayer coating, a resinuous mono- or multilayer, a vacuum-, spray-, or electro-deposited metal layer, or a pattern of discrete particles whether or not held together with a binder but sufficiently fixed to the temporary support, e.g., printing ink particles, magnetic particles or xerographic developer particles.

The transferable layer may have some relief and may either or not be transferred with an occasionally applied substratum of the temporary support.

When the hardenable substance or composition is applied from (an) inert solvent(s) or liquid dispersing medium the said solvent or liquid is preferably completely removed by evaporation before contacting the transferable material through the hardenable material with the permanent support.

In order to improve the flowing properties of a hardenable resin, diluents may be added which reduce the viscosity of the resin and improve the penetration power of the resin into the transferable material and/or into the permanent support.

Hardenable resins, which are applied in a solvent taking part in the hardening reaction are the so-called unsaturated polyester resins, which are derived from an unsaturated polyester and an addition-polymerizable monomer, e.g., styrene. The most important of these resins are the styrene-alkyd resins.

A typical example of unsaturated polyester is the reaction product of ethylene glycol and maleic anhydride.

In order to be soluble in the monomers such as styrene, vinyltoluene, vinylxylene, diallyl phthalate and others, the molecular weight of the unsaturated polyesters will not surpass 5,000. Copolymerisation is initiated by an organic peroxide, e.g., 1–2 percent benzoyl peroxide, occasionally in the presence of an accelerator, such as a tertiary amine.

No reaction products are set free on hardening or during copolymerization, so that the hardening may take place under atmospheric pressure.

Preferred representatives of hardenable polyaddition compounds are the uncured epoxy resins. They contain in their structure reactive epoxy groups which serve as terminal polymerization points. When cross-linking or curing is accomplished through these groups or through hydroxyl compounds or other compounds containing substituents with active hydrogen, a very tough, extremely adhesive and inert solid results. An epoxy resin in its most used form is represented by the following structural formula:

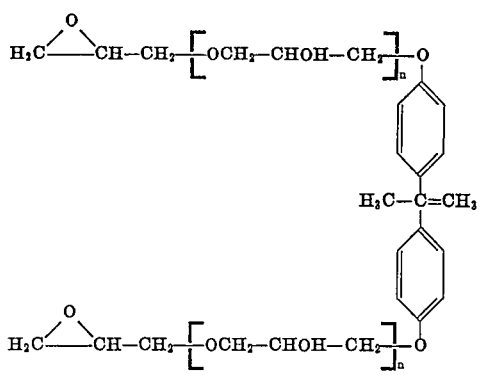

The most widely used liquid epoxy resins, viz those having viscosities in the 8,000 to 20,000 centipoise range, are predominantly of this structure. Epoxy resins wherein the bisphenol is replaced by an aliphatic diol are also known.

The three-dimensional molecular structure is obtained by curing, which is based on the reactivity of the residual epoxy groups. Ring opening of the epoxy group readily occurs in the presence of compounds with active hydrogen atoms, as is the case, e.g., in amines, acids, thiols, aromatic hydroxy compounds and alcohols. Among these curing agents those enabling a cold hardening are preferred. In this connection polyamines, polyamides and polysulphides are to be mentioned especially.

The number of potentially useful reactants for the synthesis of epoxy resins is quite large, since all varieties of polyhydric phenols, polyalcohols, polyfunctional halohydrins and polyepoxides, e.g., butadiene dioxide, can be used. Likewise classifiable as epoxy resins are monoglycidyl ether molecules containing, for a second reactive point, a mono-olefinic ether e.g., the allyl glycidyl mixed diether of 2,2-bis-(4-hydroxyphenyl)-propane.

For the preparation of epoxy resins and suitable starting materials reference is made particularly to "Epoxyd-verbindungen and Epoxydharze" by A.M. Paquin, Springer-Verlag Berlin (1958), and to "Epoxy Resins — Their Application and Technology" by Henry Lee and Kris Neville, Mc Graw Hill Book Company, Inc., New York, (1957).

The liquid epoxy resins, i.e., those wherein $n$ in the above structural formula is not greater than 2, are especially suited for use according to the present invention since they rather rapidly penetrate into a water-permeable hydrophilic or organic solvent permeable hydrophobic layer that can be transferred by the method of this invention and on hardening thereof improve the resistance to wear, humidity and heat of such layer.

When a curable resin, such as said epoxy resins, is absorbed by a colloid layer of a recording material and is hardened, the colloid layer looses its permeability and swelling power in water and becomes hard and glossy. Because of this effect it is possible to protect pictural and graphic information in colloid layers against wear and atmospherical influences such as variations in humidity and temperature. This is of great value since color photographs and transparencies with increased stability, e.g., for indoor as well as outdoor wall-decoration, can be obtained thereby.

So, the invention is advantageously applied in the production and protection of decorative and advertising information e.g., in slides, transparencies e.g., for over-head projection, information to be applied to windows, metal plates and walls which may be coated with strongly differing covering substances or elements, for instance paints or tiles.

It is evident that in addition to the occasionally necessary solvent or diluent the hardenable composition may also contain a filler, e.g., in order to obtain a white opaque image background.

In order to transfer a layer from a temporary support to a permanent support according to the present invention, the hardenable substance or composition, e.g., comprising resin and curing agent, is preferably applied in such an amount that an adhesive film is formed which enables stripping off of the temporary support from the material to be transferred without damage thereof. Indeed, the adhesion of the transferable layer or particle pattern adhering to the releasable base or temporary support preferably should not be so strong that only a part of the coating is transferred, or in other words that the cohesion thereof is broken before the adhesion with the temporary support is overcome.

In order to permit an easy release of the temporary support of (a) recording layer(s) of a recording material the latter support is preferably provided with a substratum which ensured the adherence of the transferably layer(s) to the temporary support in such a way, that on the one side the processing of the recording material is made possible without peeling off the temporary support or damage of the transferable layer, and that on the other side after the hardening of the interlayer the temporary support yet can be removed from the recording layer(s) without damaging the latter.

If they are not suited by nature all support materials in principle can be provided with an adapted substratum and in this way can act as temporary support. As temporary support smooth non-porous materials such as resin films, glass plates and metal sheets or layers, e.g., aluminium-coated paper, can be used.

Dimensionally stable resin bases, e.g., made of the resins of the class of the polymethylene terephthalates, such as polyethylene terephthalate the preparation of which has been described in U.S. Pat. No. 2,465,319, are preferred.

All kinds of layers and sets of layers can be transferred. The invention is especially suited for the transfer of information, which has been stored in recording layers comprising hydrophilic colloids e.g., gelatin and poly-N-vinylpyrrolidone making part of photographic silver halide materials or thermographic materials.

Such layers are sufficiently known from the classical silver halide photography and from the thermographic techniques wherein use is made of recording layers, which under the influence of heat undergo a change in water-permeability, such as described, e.g., in the published Dutch Pat. applications Nos. 6414226, 6601617, 6606719, 6608504, 6608711, 6608712, 6700359, 6714061, 6714345, to be read in conjunction herewith. In the latter thereographic materials the image-wise heating effects a change in solubility of selected portions of the recording layer which makes it possible to form a visible relief pattern by a washing step. The portions of the recording layer left in the form of the image to be reproduced can, according to the transfer technique of the present invention, be transferred to a permanent support. This embodiment is particularly suited for the manufacture of advertising and instrument panels, and for the application of decorative information on windows and walls.

The present invention is preferably carried out in conjunction with a heat-sensitive recording material as described in the published Dutch Pat. application Nos. 6414226 and 6606719. The preferably utilized heat-sensitive recording material comprises a heat-sensitive recording layer, which contains a hydrophilic binder wherein solid hydrophobic thermoplastic polymer particles are dispersed in a ratio preferably above 1:1 by weight in respect of the binder. Preferably the recording layer contains in addition to these polymer particles substances which transform absorbed light into heat, so providing the image-wise heating of the recording layer when the latter is image-wise exposed to light.

The following examples illustrate the present invention.

Example 1

A poly(ethylene terephthalate) support of 0.1 mm. thickness is coated with the following composition pro rata of 20 g. per sq. m.

| | |
|---|---|
| 20 % aqueous dispersion of polyethylacrylate having a particle size of less than 0.1 $\mu$ | 50 g. |

| | |
|---|---|
| 40 % aqueous dispersion of polyethylene having a particle size of less than 0.1 μ and an average molecular weight comprised between 15,000 and 30,000 | 50 g. |
| 30 % aqueous dispersion of silica having an average particle size of 0.025 μ | 50 g. |
| water | 700 g. |
| 3 % aqueous solution of the sodium salt of the condensation product of oleic acid and methyltaurine | 50 g. |

The interlayer thus obtained is dried at 30° C.

On this layer a heat-sensitive layer, for use in a washing away development by rubbing with a cotton pad soaked with water of 20° C., is coated pro rata of 15 g. per sq.m. from the following composition:

| | |
|---|---|
| 10 % aqueous solution of poly-N-vinyl pyrrolidone | 170 g. |
| 40 % aqueous dispersion of polyethylene as described above | 195 g. |
| water | 120 g. |
| aqueous carbon dispersion containing per 100 g. 16 g. of carbon (average particle size 0.1 μ) and 2 g poly-N-vinylpyrrolidone | 450 g. |
| 3 % aqueous solution of the sodium salt of tetradecyl sulphate | 65 g. |

After drying, the material is contact-exposed through a negative transparency being a reproduction of a printed text. The exposure is carried out by means of a xenon gas discharge lamp placed at a distance of 4 cm. of the recording layer and having a capacity of 1000 watt.sec. producing light in a time of one two-thousandths sec.

After exposure the recording layer is rubbed with a cotton pad wetted with water of 20° C., in this way removing the nonexposed and still water-permeable parts of the recording layer.

The obtained copy with its image-relief was pressed against a fairly rigid paper sheet (permanent support) of 250 μ thickness coated with a polyethylene layer. The polyethylene has a melting temperature of approximately 100° C. and is marketed under the name EPOLENE C by Eastman Kodak, U.S.A.

By heating together the elements pressed against each other in a thermographic copying apparatus and by cooling to room temperature (10 sec.), the polyethylene terephthalate support could be stripped off. Hereby together with the adhesive layer of the polyethylene terephthalate support (temporary support) the relief image was transferred onto the paper and fixed thereon by means of the polyethylene layer.

The same result was obtained with said paper carrying a layer of a low molecular weight polyethylene marketed by Scholven Chemie A.G., W. Germany, under the trade name RUHRWACHS SH 105 (melting point : about 90° C.), or a layer of carnauba-wax (m.p. : 78° C.), or a layer of sucrose benzoate (melting point: 91° C.) or a layer of polyhexamethylene adipate (melting point : 56° C.).

Example 2

A solution of an unsaturated polyester in styrene marketed under the trade name VESTOPAL 130 by Chemische Werke Hüls A.G. Marl. Westf., W. Germany, was mixed with 15 percent by weight of methyl ethyl ketone peroxide as initiator and with 5 percent by weight of cobalt naphthenate as accelerator, and then applied in the form of a layer to an aluminum sheet.

An image-wise exposed, developed and fixed photographic gelatino-silver halide emulsion of the graphic type (lith type) being present on a polyethylene terephthalate support, was then pressed against the coated aluminum sheet by means of a roller. In this way the surplus adhesive between the sandwich was removed by squeegeing. After heating at 80° C. for 15 min. in an oven, or keeping 2 hrs. at room temperature, the polyethylene terephthalate support was removed by stripping, whereby the emulsion layer containing the silver image information was left on the aluminum sheet.

A same transfer was obtained with equally good results on glass, plexiglass, card-board and paper.

Example 3

A polyadduct of 2,2-bis(4-hydroxyphenyl)-propane and epichlorohydrin having an epoxy equivalent of 184–190 and a viscosity of 11,000 cp. at 25° C. was mixed with VERSAMID 115 (VERSAMID 115 is a trade name for a polyamide of General Mills Inc., Kankakee, Ill., U.S.A.).

The hardenable liquid adhesive thus obtained was applied as a thin layer to a glass plate, whereupon a developed thermographic material as described in Example 4, with its image side is pressed against the adhesive layer by means of a roller. After keeping the whole composition for one-half hr. in an oven at 70° C. and for 4 hrs. at room temperature (20° C.), the polyethylene terephthalate support was stripped from its substratum.

The transfer was also easily effected on copper, aluminum polymethyl methacrylate, plywood, ceramic tiles, porous tiles, polyethylene terephthalate film, cellulose triacetate film, or textile as nylon cloth or gauze.

On a porous permanent support more adhesive has to be applied.

Example 4

A polyethylene terephthalate support (temporary support) of 0.075 mm. thick was coated with following composition at a rate of 20 g. per sq.m. :

| | |
|---|---|
| 40 % aqueous dispersion of polyethylene described in example 1 | 50 g. |
| 20 % aqueous dispersion of copoly(vinylidene chloride/N-butylmaleimide/itaconic acid) (88/10/2) with an average particle size of 0.1 μ | 50 g. |
| 30 % aqueous dispersion of silica with an average particle size of 0.025 μ | 50 g. |
| water | 750 g. |
| ethanol | 100 g. |

The coating acting as a subbing layer was dried at 40° C. After the drying a blue colored composition forming the heat-sensitive recording layer containing the following ingredients was coated at a rate of 20 g. per sq.m. :

| | |
|---|---|
| 10 % aqueous dispersion of poly-N-vinyl pyrrolidone | 180 g. |
| water | 387 g. |
| 40 % aqueous dispersion of poly-ethylene described in example 1 | 195 g. |
| HELIOGENBLAU B Colanyl Teig (C.I. Pigment Blue 15) (pigment Marketed by Badische Anilin- & Soda-Fabrik A.G., W. Germany) | 170 g. |
| 5 % aqueous solution of TERGITOL 4 (sodium sulphate derivative of 7-ethyl-2-methyl-undecanol 4 sold by Union Carbide Corporation, and TERGITOL is a registered trade mark) | 45 g. |

After drying the recording layer it was contacted with an opaque positive line original and exposed with infrared light in a thermographic copying apparatus whereby the recording layer was heated in correspondence with the infrared absorbing image-markings of the original.

After the exposure the recording layer was removed in the nonheated areas by rubbing it with a plug of cotton soaked with water. A positive blue transparent copy of the original was obtained.

A transparent green copy was obtained in the same way but by replacing the blue pigment in the recording composition by a green one viz Pigment Green 6 C.I. 74,260.

The colored image colloid parts of the blue transparency were permanently transferred onto a polyethylene terephthalate base in the following way :

The colloid layer containing the blue image was coated with a liquid adhesive layer composed of 50/50 by weight mixture of EPOXYDHARZ 0164/D (trade name of Gesellschaft für Leerverwertung, W. Germany) for an epoxy resin comprising a polyadduct of 2,2-bis(4-hydroxyphenyl)-propane and epichlorohydrin having an epoxy equivalent of 184–190 and a viscosity of 11,000 cp. at 25° C.) and VERSAMID 115 (trade name) and firmly pressed against a polyethylene terephthalate film, the adhesive layer being hardened for 1 hr. at 80° C. After the hardening of the adhesive layer, the temporary support was stripped off from its subbing layer.

As a result thereof the subbing layer as an outermost layer covers the transferred blue colloid layer portions.

The transfer of the green colored colloid parts was affected in register with the blue parts so that as a final result a completely erasure-proof blue and green color transparency with high fastness to light and humidity on a dimensionally stable polyester resin base was obtained.

On substituting in the heat-sensitive layer the blue pigment by a mixture of

Heliogenblau B Colanyl Teig (C.I. Pigment blue 15) marketed by Badische Anilin- & Soda-Fabrik A.G., W. Germany, Permanent gelb HR Colanyl Teig (C.I. Pigment yellow 83) marketed by Farbwerke Hoechst A.G., Frankfurt (M), W. Germany, Permanent Carmin FBB Colanyl Teig (C.I. Pigment red 146), marketed also by Farbwerke Hoechst A.G., in a ratio by weight of 6/5/6 a transparency with black image parts is obtained. Indeed these dyes form in the indicated ratio a black composition which is infrared transparent (the pigments are absorbing in the visible spectrum but not in the infrared).

We claim:

1. A method of transferring a colored permeable hydrophilic colloid relief pattern from a temporary hydrophobic support carrying the same to a permanent support which comprises the steps of applying to the surface of at least the pattern areas of said temporary support a coating of a liquid adhesive consisting essentially of a liquid epoxy resin having a viscosity of 8,000 to 20,000 centipoise at 25° C., allowing said adhesive to penetrate into the hydrophilic colloid of said pattern, bringing said colloid relief pattern into contact with a permanent support, and allowing to harden said adhesive while said contact is maintained, and then peeling off the temporary support from the colloid relief pattern while the latter remains adhered to the permanent support.

2. A method according to claim 1 wherein the temporary support is a polyethylene terephthalate support.

3. A method according to claim 1 wherein the hydrophilic colloid is gelatin or poly-N-vinylpyrrolidone.

4. A method according to claim 1 wherein the liquid epoxy resin has the following structural formula:

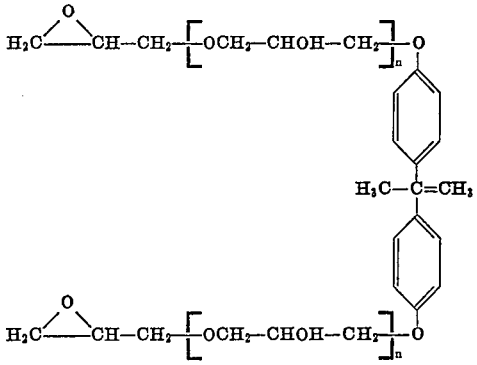

wherein $n$ is a positive integer not greater than 2.

* * * * *